(12) United States Patent
Head

(10) Patent No.: US 9,210,917 B1
(45) Date of Patent: Dec. 15, 2015

(54) BAIT-FISH TRAP

(71) Applicant: Clyde W Head, Granbury, TX (US)

(72) Inventor: Clyde W Head, Granbury, TX (US)

(*) Notice: Subject to any disclaimer, the term of this patent is extended or adjusted under 35 U.S.C. 154(b) by 0 days.

(21) Appl. No.: 14/467,292

(22) Filed: Aug. 25, 2014

Related U.S. Application Data

(63) Continuation-in-part of application No. 13/533,274, filed on Jun. 26, 2012, now abandoned.

(60) Provisional application No. 61/526,417, filed on Aug. 23, 2011.

(51) Int. Cl.
*A01K 69/00* (2006.01)
*A01K 69/06* (2006.01)

(52) U.S. Cl.
CPC ..................... *A01K 69/06* (2013.01)

(58) Field of Classification Search
CPC ....... A01K 69/00; A01K 69/06; A01K 69/08; A01K 79/00; A01D 75/02
USPC ............................................ 43/100, 102, 103
See application file for complete search history.

(56) References Cited

U.S. PATENT DOCUMENTS

| | | | | | |
|---|---|---|---|---|---|
| 798,670 | A | * | 9/1905 | Gee | 43/65 |
| 4,589,221 | A | * | 5/1986 | Mattison | 43/17.6 |
| 4,628,520 | A | * | 12/1986 | Menger | 377/6 |
| 4,980,989 | A | * | 1/1991 | Davis | 43/100 |
| 5,331,148 | A | * | 7/1994 | Kvassheim | 250/221 |
| 5,555,666 | A | * | 9/1996 | Glatzer | 43/17 |
| 6,775,946 | B2 | * | 8/2004 | Wright | 43/61 |
| 8,553,501 | B1 | * | 10/2013 | Cota | 367/131 |
| 8,651,057 | B1 | * | 2/2014 | Welsh | 119/200 |
| 2006/0150470 | A1 | * | 7/2006 | Ronnau | 43/58 |
| 2006/0265941 | A1 | * | 11/2006 | Newton | 43/58 |
| 2008/0120895 | A1 | * | 5/2008 | Schwartz et al. | 43/61 |
| 2008/0236023 | A1 | * | 10/2008 | Thomas et al. | 43/58 |
| 2013/0167428 | A1 | * | 7/2013 | Alhuwaishel | 43/102 |
| 2013/0219769 | A1 | * | 8/2013 | Hey et al. | 43/4.5 |

* cited by examiner

*Primary Examiner* — Christopher P Ellis
*Assistant Examiner* — Richard G Davis
(74) *Attorney, Agent, or Firm* — Kenneth L Tolar

(57) ABSTRACT

An improved bait-fish trap includes a cylindrical, mesh shell having a continuous outer wall, a lower surface and an open upper end. The shell houses a mesh entrance cone having an upper base that is concentric with the open upper end of the shell, and a lower vertex in communication with an underlying entrapment chamber. A remotely controlled light module lures bait fish from the entrance cone into the entrapment chamber where they are held until removed via a releasable hatch. A capacity indicator automatically notifies a user when the entrapment zone is full of bait fish.

13 Claims, 3 Drawing Sheets

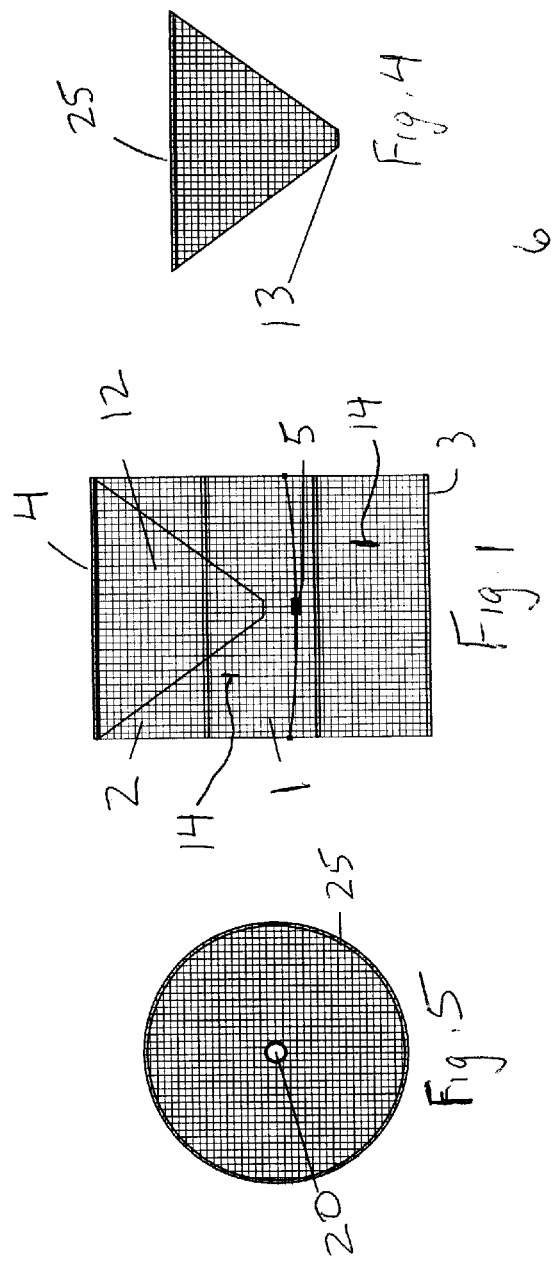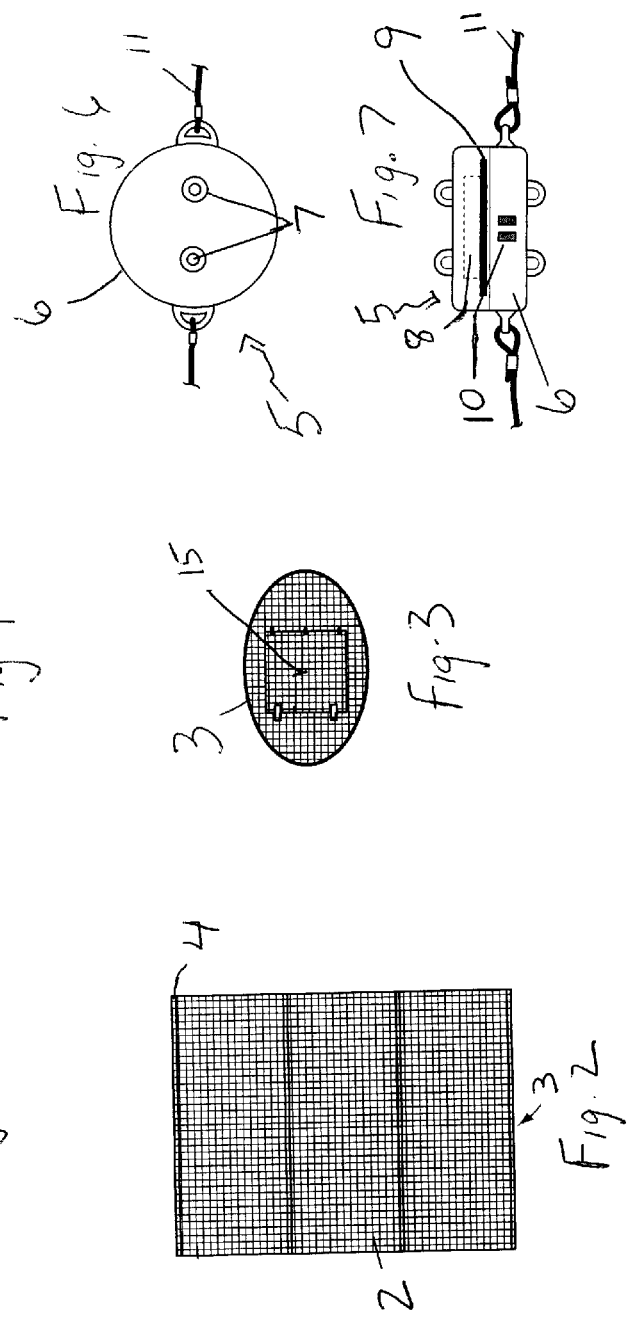

BAIT-FISH TRAP

CROSS REFERENCE TO RELATED APPLICATIONS

This application is a continuation-in-part of application Ser. No. 13/533,274 filed on Jun. 26, 2012, now abandoned, which claimed the benefit of provisional application No. 61/526,417 filed on Aug. 23, 2011, the specifications of which are both hereby incorporated by reference.

BACKGROUND OF THE INVENTION

The present invention relates to a trap having an automated or remotely controlled light for luring bait fish into an entrapment zone.

DESCRIPTION OF THE PRIOR ART

Minnows and similar bait fish are difficult to capture with ordinary fish nets. Using a seine requires at least two people to wade into a body of water, which is laborious and perilous. Although a myriad of bait-fish traps exist in the prior art, they are laborious to use and rarely effective. Accordingly, there is currently a need for a trap that allows a user to easily capture bait fish. The present invention addresses this need by providing a trap having a light module that lures bait fish through an entrance cone and into an entrapment chamber.

SUMMARY OF THE INVENTION

The present invention relates to an improved bait-fish trap including a cylindrical, mesh shell having a continuous outer wall, a lower surface and an open upper end. The shell houses a mesh entrance cone having an upper base that is concentric with the open upper end of the shell, and a lower vertex in communication with an underlying entrapment chamber. An automated or remotely controlled light module lures bait fish from the entrance cone into the entrapment chamber where they are held until removed via a releasable hatch. A capacity indicator automatically notifies a user when the entrapment zone is full of bait fish.

It is therefore an object of the present invention to provide an improved bait-fish trap.

It is another object of the present invention to provide a bait-fish trap having an integral, remotely controlled light module for attracting bait fish.

It is yet another object of the present invention to provide a bait-fish trap having a capacity indicator that automatically notifies a user when an entrapment zone is full of bait fish. Other objects, features and advantages of the present invention will become readily apparent from the following detailed description of the preferred embodiment when considered with the attached drawings and the appended claims.

BRIEF DESCRIPTION OF THE DRAWINGS

FIG. 1 is a front, plan view of the bait-fish trap according to the present invention.
FIG. 2 is an isolated, plan view of the shell.
FIG. 3 is a bottom, sectional view of the shell.
FIG. 4 is a front, isolated view of the entrance cone.
FIG. 5 is a top, isolated view of the entrance cone.
FIG. 6 is a top, isolated view of the light module.
FIG. 7 is a front, isolated view of the light module.

DESCRIPTION OF THE PREFERRED EMBODIMENT

Figure 9:
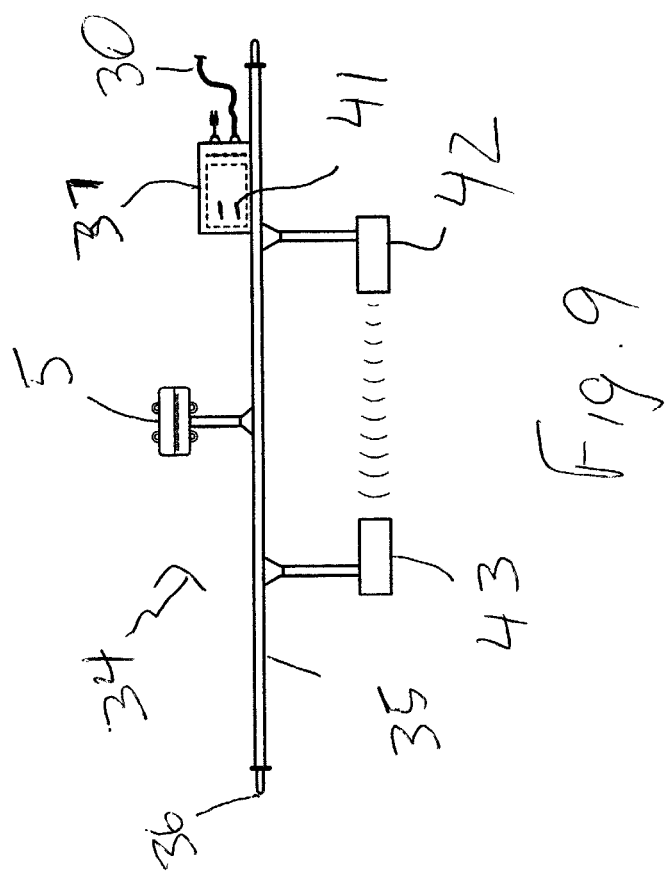
FIG. 9 is an isolated view of the capacity indicator.

The present invention relates to an improved bait-fish trap comprising a cylindrical shell 1 having a continuous outer wall 2, a lower surface 3 and an open, circular upper end 4. The shell is constructed entirely with a wire mesh having openings that are dimensioned to allow smaller, useless minnows to escape.

At the upper end of the shell is an entrance cone 12 that is likewise constructed with wire mesh. The cone includes an upper base 25 that is concentric with the open upper end 4 of the shell, and a lower vertex 13 having an aperture 20 in communication with an underlying entrapment chamber 14. The inverted entrance cone funnels bait fish downwardly toward the vertex aperture 20; the resulting increase in fish density near the vertex discourages the fish from swimming back toward the entrance cone. Furthermore, once in the entrapment chamber, the bait fish are unlikely to locate the opening and return to the entrance cone.

Within the entrapment chamber is a light module 5 for luring bait fish into the entrance cone. The light module includes a transparent housing 6 having a plurality of LEDs 7 mounted on the exterior surface thereof that are powered with an internally disposed battery 8. Preferably, the LEDs emit only blue and/or white light, which is more radiant in water as compared to other wavelengths. A pair of contacts 10 on a peripheral edge of the housing are electrically connected to an operational amplifier circuit 9 and the battery 8; whenever the housing is submerged in water, the LED circuit closes to automatically energize the lights; when the housing is removed from water, the circuit reopens to automatically deactivate the lights. A cable 11 attached to each of two opposing sides of the housing releasably tethers the housing to the shell outer wall. On the lower wall of the shell is a releasable hatch 15 for removing bait fish from the entrapment chamber or for accessing the light module.

Accordingly, to use the trap according to the present invention, a fisherman immerses the shell in water to automatically activate the LEDs. Once nearby bait fish are lured into the entrance cone, they will attempt to access the lights by swimming through the vertex aperture and into the entrapment chamber. The lights and the minuscule vertex opening keep the trapped minnows within the entrapment chamber until they are removed via the releasable hatch.

Figure 8:
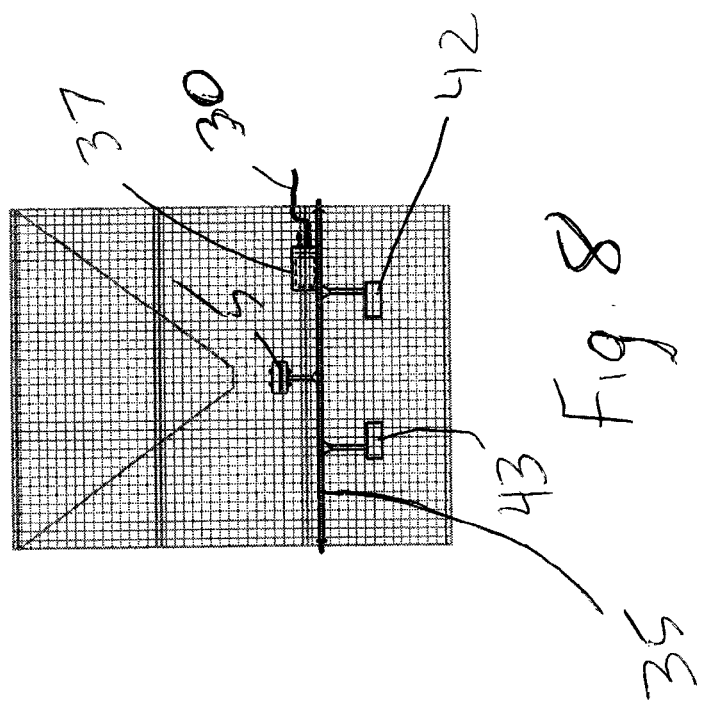
FIG. 8 is a front, plan view of a slightly different embodiment of the bait-fish trap according to the present invention.
Figure 11:
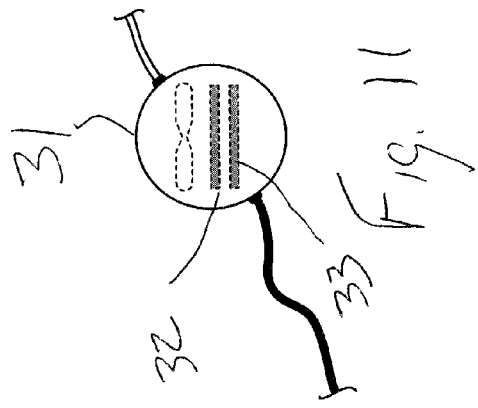
FIG. 11 is an isolated view of the electronics housing.
Figure 12:
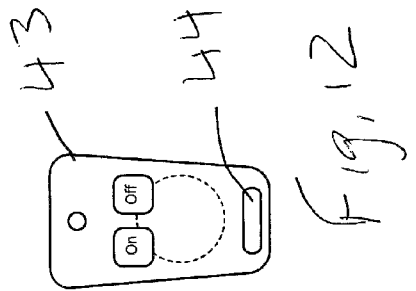
FIG. 12 is an isolated view of the remote unit.
Figure 10:
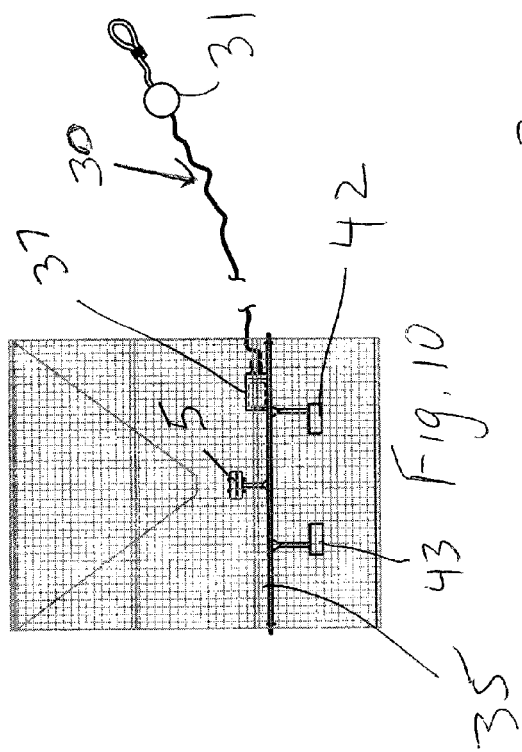
FIG. 10 depicts the bait-fish trap of FIG. 8, and the tethering cable having a wireless receiver attached thereto.
Figure 13:
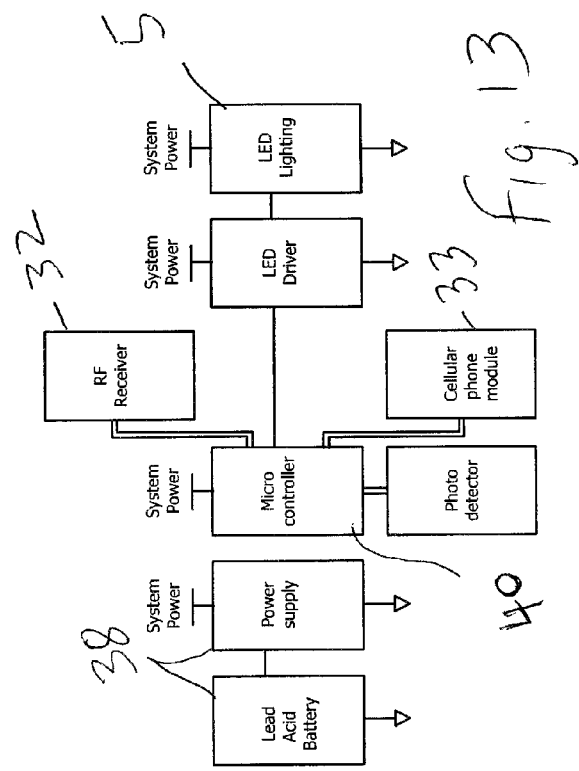
FIG. 13 is a block diagram of the electronic components.

Now referring specifically to FIGS. 8-13, a slightly different embodiment is disclosed which includes a tethering cable 30 having an electronics housing 31 attached thereto. A wireless transceiver 32 and a cellular telephone transmitter 33 are received within the housing for transmitting wireless signals as described in more detail below.

The trap also includes a capacity indicator 34 for alerting a user when the trap is substantially full of bait fish. The indicator includes an elongated rod 35 having a narrow tip 36 at each of two opposing ends that pass through the mesh shell to horizontally suspend the rod therein. Mounted on the rod is a light module 5 similar to that described above and an enclosure 37 having a rechargeable battery 38 and microcontroller 40 received therein. The microcontroller is electrically connected to the wireless transceiver within the tethering-cable housing. A pair of contacts 41 on the enclosure exterior activate the microcontroller whenever the enclosure is submerged in water. The rod is easily removable from the shell to recharge the battery when necessary.

Depending from the rod are a light transmitter 42 and a facing photodetector 43 that are each electrically connected to the microcontroller. When the microcontroller is activated by submerging the enclosure, a light beam is continuously transmitted toward the photodetector. The microcontroller continuously monitors the frequency in which the beam is interrupted. If a predetermined frequency of interruptions occurs within a given time interval, the microcontroller assumes that the trap is full of bait fish and initiates a response.

The response includes instructing the cellular-telephone transmitter to create and send a text message to a predetermined smart-phone number to inform the recipient that the trap requires attention. Then, the microcontroller disables the capacity indicator, idles for a preprogrammed duration and then transmits another warning message. The repeated message transmission continues until the rechargeable battery is depleted or the trap is removed from the water, at which time the microcontroller memory is erased and reset.

The trap further includes a remote unit 50 that is in select wireless communication with the transceiver in the electronics housing 31. When an activation button 44 is depressed, a wireless signal is transmitted to the transceiver, which instructs the microcontroller to activate the light module 5 as described above.

Accordingly, a user tethers the trap to a tree or similar external support to assure that the electronics housing 31 remains dry. The user then activates the LEDs, if desired, with the remote unit and submerges the mesh shell within a body of water to activate the microcontroller. The capacity indicator allows the user to stray a desired distance from the area for a prolonged period of time, if desired. Once the trap is substantially full of bait fish, the user will automatically receive a text message to return and unload the trap.

The above-described device is not limited to the exact details of construction and enumeration of parts provided herein. For example, though the light module is depicted and described herein as including LEDs, any type of light source may be used. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An improved bait-fish trap comprising:
  a cylindrical shell having a continuous outer wall, a lower surface and an open upper end;
  an entrance zone within said shell that is accessible from the open upper end;
  an entrapment chamber formed within said shell and segregated from said entrance zone;
  a passageway from said entrance zone to said entrapment chamber;
  a light in said entrapment chamber for alluring bait fish from said entrance zone, through said passageway and into said entrapment chamber;
  means for alerting a user when said entrapment chamber is full of bait fish.

2. The improved bait-fish trap according to claim 1 wherein said means for alerting a user when said entrapment chamber is full of bait fish comprises:
  a light transmitter within said entrapment chamber;
  a photodetector within said entrapment chamber, said photodetector facing said light transmitter;
  a controller in communication with said light transmitter and said photodetector for determining a frequency in which a light beam projected by said light transmitter is interrupted.

3. The improved bait-fish trap according to claim 2 further comprising means for remotely activating said light.

4. The improved bait-fish trap according to claim 3 wherein said means for remotely activating said light means comprises:
  a tethering cable attached to said shell;
  an electronics housing attaching to said tethering cable, said electronics housing having a wireless transceiver therein in communication with said light;
  a wireless transmitter in communication with said transceiver.

5. The improved bait-fish trap according to claim 2 further comprising means for transmitting a wireless text message to a remote telephone when said entrapment chamber is full of bait fish.

6. The improved bait-fish trap according to claim 5 wherein said means for transmitting a wireless text message to a remote telephone when said entrapment chamber is full of bait comprises a cellular telephone transmitter in communication with said controller.

7. The improved bait-fish trap according to claim 2 wherein said light, said light transmitter and said photodetector are each mounted on an elongated rod having a narrow tip at each of two opposing ends that pass through said mesh shell to horizontally suspend said rod therein.

8. The improved bait-fish trap according to claim 2 further comprising means for activating said controller only when said shell is immersed in water.

9. The improved bait-fish trap according to claim 8 wherein said means for activating said controller only when said shell is immersed in water comprises:
  an enclosure having a battery and said controller received therein, said enclosure positioned within said shell;
  a pair of contacts on an exterior surface of said enclosure, said contacts electrically connected to said controller and said battery to form a closed circuit between the controller and said battery when said enclosure is submerged in water.

10. The bait-fish trap according to claim 1 wherein said shell includes a releasable hatch on the lower surface for removing bait fish from the entrapment chamber and for accessing said light.

11. The bait-fish trap according to claim 1 wherein said entrance zone is conical having a lower vertex with said passageway formed thereon that funnels bait fish downwardly from said open upper end toward said entrapment chamber while deterring said bait fish from returning to said entrance zone.

12. The bait-fish trap according to claim 11 wherein said entrance zone further includes a circular, upper base that is concentric with the open upper end of the shell.

13. The bait-fish trap according to claim 1 wherein said shell and said entrance zone are defined by wire mesh barriers that allow passage of smaller, useless bait fish.

* * * * *